(12) United States Patent
Schlemm

(10) Patent No.: US 6,385,558 B1
(45) Date of Patent: May 7, 2002

(54) PROCESS AND DEVICES FOR MONITORING FACILITIES IN THE CHEMICAL INDUSTRY

(75) Inventor: Friedrich Schlemm, Hannover (DE)

(73) Assignee: BEB ERDAS und Erdöl GmbH (DE)

( * ) Notice: Subject to any disclaimer, the term of this patent is extended or adjusted under 35 U.S.C. 154(b) by 0 days.

(21) Appl. No.: 09/315,483

(22) Filed: May 20, 1999

(30) Foreign Application Priority Data

May 27, 1998 (DE) .......................................... 198 23 599

(51) Int. Cl.⁷ ............................................... G08B 21/00
(52) U.S. Cl. ........................... 702/182; 702/30; 702/35; 702/183; 702/184; 702/185
(58) Field of Search .............................. 702/19, 22, 23, 702/27, 28, 30–36, 39, 40, 56, 54, 103, 113, 114, 122, 121, 123, 182–185, 187, 188, FOR 103, FOR 104, FOR 115–120, FOR 123–125, FOR 134–135, FOR 137, FOR 139, FOR 170–171; 700/266, 274; 348/82; 73/23.24, 23.2, 31.06, 31.05; 422/90, 98, 82.02; 340/632, 634; 205/787

(56) References Cited

U.S. PATENT DOCUMENTS

| | | | | |
|---|---|---|---|---|
| 4,728,839 A | * | 3/1988 | Coughlan et al. | 310/112 |
| 5,106,755 A | * | 4/1992 | Tanaka | 436/137 |
| 5,149,504 A | * | 9/1992 | Tanaka | 73/23.31 |
| 5,156,042 A | * | 10/1992 | Carlin et al. | 73/49.2 |
| 5,210,526 A | * | 5/1993 | Imperiali | 340/605 |
| 5,428,985 A | * | 7/1995 | Kurtz et al. | 73/25.01 |
| 5,832,411 A | * | 11/1998 | Schatzmann et al. | 702/23 |
| 5,918,257 A | * | 6/1999 | Mifsud et al. | 73/23.34 |
| 6,061,141 A | * | 5/2000 | Goldenberg et al. | 356/437 |
| 6,076,392 A | * | 6/2000 | Drzewiecki | 83/23.2 |
| 6,102,617 A | * | 8/2000 | Hampton | 405/52 |
| 6,170,318 B1 | * | 1/2001 | Lewis | 73/23.34 |

* cited by examiner

Primary Examiner—Marc S. Hoff
Assistant Examiner—Carl S. Tsai
(74) Attorney, Agent, or Firm—Lackenbach Siegel LLP

(57) ABSTRACT

The invention relates to processes and devices for monitoring facilities of the chemical industry. It is the task of the invention, to carry out cost-effectively with simple means and in simple manner the monitoring of such facilities under automation and in this way to avoid damages. The invention comprises that by means of microphones or other acoustic sensors, cameras and electronic odor sensors electronic data are generated and these are supplied to an evaluation device with comparison circuitry, memories of electronically acquired data and display as well as report-generating devices, in which the temporary acquired electronic measurement values are compared with measurement values of an initial measurement and/or of the preceding measurement and, in the event given deviation values are exceeded, triggers a report process. For this purpose a device is used comprising microphones or other acoustic sensors, cameras, electronic odor sensors and an evaluation device with comparison circuitry, memories for electronically acquired data and display and/or report-generating devices, wherein the evaluation device comprises comparison circuits in which the temporary acquired electronic measurement values are compared with measurement values of an initial measurement and the preceding measurement and, if given deviation values are exceeded, a report process is triggered. It is in this way possible to carry out the measurements entirely without personnel and to evaluate them completely automatically in an electronic facility.

14 Claims, 3 Drawing Sheets

PROCESS AND DEVICES FOR MONITORING FACILITIES IN THE CHEMICAL INDUSTRY

Figure 1:
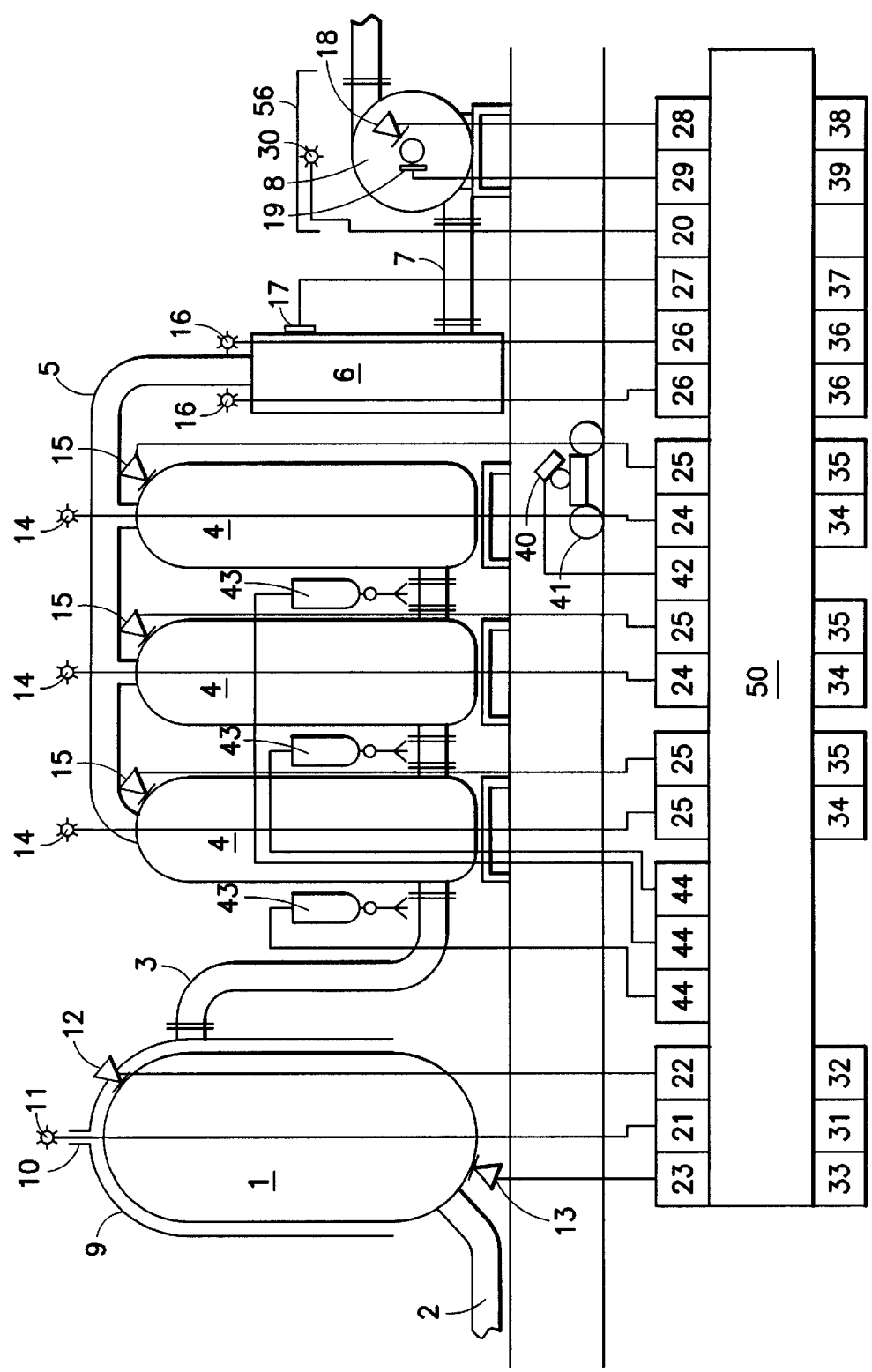

The invention relates to processes and devices for monitoring facilities in the chemical industry.

In the chemical industry, and included herein are also industries for developing and utilizing deposits {and sources} of liquid and gaseous raw materials, and specifically in particular crude petroleum and natural gas, facilities for extraction, for transportation, for processing and for refining the raw materials and the semifinished and finished products obtained from them are operated in halls as well as often also outdoors. In particular the operation of facilities in which work with flammable and explosive materials takes place, frequently is carried out outdoors since here substances escaping unintentionally from the facilities do not cause any or only lesser damage to the facilities and buildings than within halls. If, however, relatively large quantities of the substances worked and processed in these facilities escape, considerable environmental damage can be generated.

It is therefore necessary to monitor such facilities often operating completely automatically over long periods of time for their faultless operation and to check for leakages of the pipes and the facility parts as well as for external or other influences. This takes place on control consoles in a room of the plant as well as by visual inspection outdoors. The attentiveness of the personnel used for these functions frequently lapses over the course of the observation time because such monitoring tasks are perceived by the personnel as tiring and also as boring.

The invention avoids the disadvantages of prior art. It is the task of the invention to carry out cost-effectively with simple means and in simple manner the monitoring of such facilities in an automated way and thus to avoid damages.

The invention comprises that by means of microphones or other acoustic sensors, cameras and electronic odor sensors electronic data are generated and that these are supplied to an evaluation device with comparison circuitry, memories for electrically acquired data and display as well as report-generation devices, in which the temporary acquired electronic measurement values are compared with measurement values of an initial measurement and/or of the preceding measurement and [which] trigger a report process when the given deviation values are exceeded.

For this purpose a device is used which comprises microphones or other acoustic sensors, cameras, electronic odor sensors and an evaluation device with comparison circuitry, memories for electronically acquired data and display and/or report-generating devices, wherein the evaluation device comprises comparison circuits in which the temporary acquired electronic measurement values are compared with measurement values of an initial measurement and of the preceding measurement and, if a given deviation values is exceeded, a report process is triggered.

This makes it possible to carry out measurements entirely without personnel and to evaluate them completely automatically in an electronic system which, in the event of any irregularities due to a defect of the facility, outputs a report.

The measurements required for this purpose and their evaluation is usefully carried out at specific time intervals. The measured values obtained are either compared with the measurements recorded in the last measurement(s) or a comparison with a measurement is carried out which was recorded when the facility was taken into operation.

In the case of facilities to be monitored, frequently a multiplicity of measurement sites must be set up. Their number can be reduced if the locations of the microphones, cameras and/or electronic odor sensors are changed after each measurement. For this purpose it is useful if measuring instruments are mounted on one or several vehicles which carry measurement and observation instruments and which can be moved on tracks.

Considerable problems in the implementation of these measurements and observations in the case of facilities constructed outdoors can occur due to climate effects, in particular wind and rain; but also through external effects occurring in the vicinity, for example, from agriculture, road traffic, facilities of the chemical industry etc. It is therefore useful to correct the electronic measurement values obtained from the acoustic sensors and electronic odor sensors before they are supplied further to the evaluation station with electronic measurement values obtained from acoustic comparison sensors and electronic comparison odor sensors. For this purpose serves a correction circuit which, on the one hand, is connected to the acoustic sensors, cameras and electronic odor sensors serving for monitoring the facility parts and, on the other, to acoustic comparison sensors and electronic comparison odor sensors. The counter-phase superposition of the signals from the acoustic comparison sensors and electric comparison odor sensors onto the signals from the acoustic measurement sensors and odor sensors can eliminate disturbances through wind, rain and other external influences.

In this measuring and inspection work as cameras can be used, in particular video sensors and infrared cameras, and in the evaluation system locations of increased or decreased temperature can be identified. Due to the escape through a fine hole of a medium under pressure in a pipeline a noise occurs at this location and considerable cooling. The video sensors are primarily used for detecting the presence of non-authorized persons and natural events such as fallen trees, fires, etc.

As acoustic sensor can also be used an artificial head equipped with microphones in order to locate the direction from which sound is coming.

In this measuring and inspecting work as microphones can be used solid-structure microphones which are attached on pipes, machines, bearings, pumps, pressure generators and similar facility parts.

But it is also possible to use as acoustic sensors directional microphones which are directed toward specific facility parts or whose effective direction extends next to specific facility parts, for example next to straight pipes to be monitored in which sound is detected occurring due to escaping medium.

It is useful to provide a possibility procedurally and in the circuit by which, following a report of a noticeable event, the flow of the automatically running measuring process is interrupted and measuring instruments, in particular an infrared and/or video camera, can be driven under manual control to the site reported as being spurious or can be directed to this site.

It can also be of advantage if at the site reported as being spurious a control substance is applied. For this purpose, the container under pressure could be provided with a liquid forming foam which, triggered by the monitor circuit, sprays the liquid onto the site which has been noticed as being suspicious such that subsequently, for example with the aid of a video camera, it is possible to observe visually whether or not foam forms in the event of escaping gas at the conspicuous site.

The monitoring device works usefully with a circuit for initiating the measuring processes at different locations of the facility to be monitored at specific time intervals. This makes possible that all measuring points are checked successively at specific time intervals. A circuit for the continuously repeated initiation of the measuring cycle is therein of advantage.

The number of the measuring instruments to be used can be minimized through the use of movable, shiftable and/or pivotable supports of the acoustic sensors, cameras and/or electronic odor sensors and a circuit for changing the measuring site between each two measurements, and thereby the purchase expenditures for such a device can be reduced.

Figure 2:
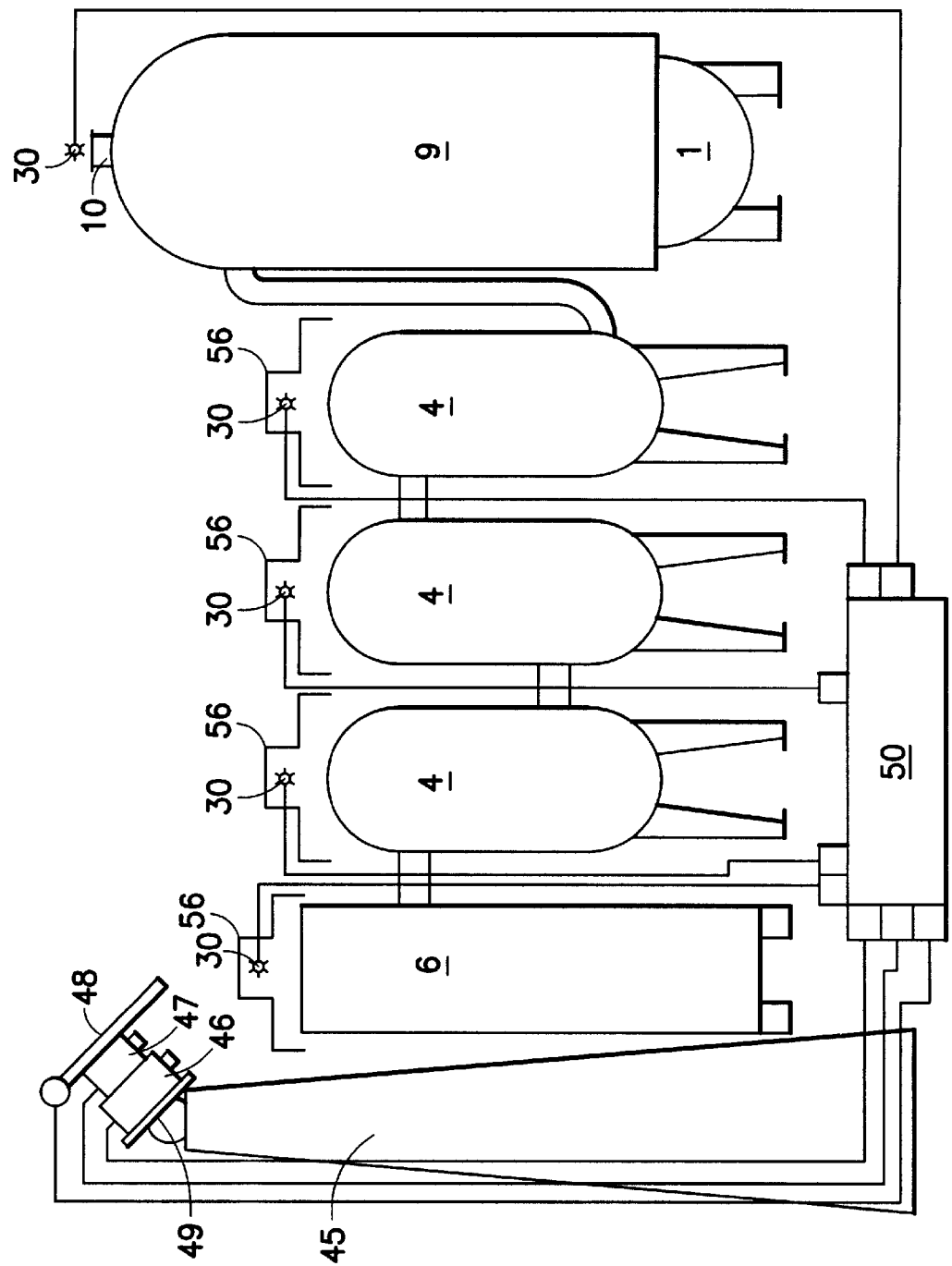
Figure 3:
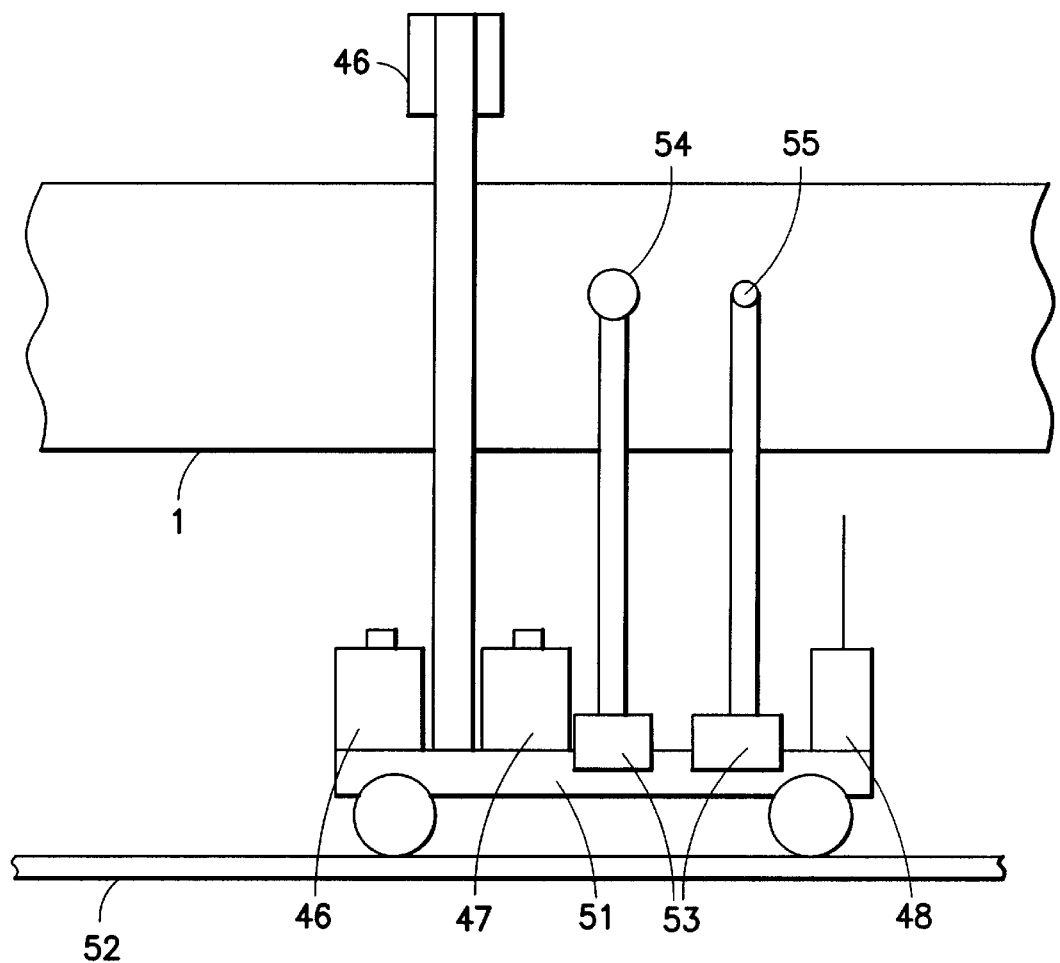

In the following the essence of the invention will be explained in further detail in conjunction with an embodiment example shown schematically in the drawing.
Therein depict:

FIG. 1 a block circuit diagram of a facility with monitoring device, whose sensors are disposed at different sites of the facility, FIG. 2 a remote monitoring system installed on a tower, FIG. 3 a monitoring device installed on a carriage.

The facility of FIG. 1 comprises a reactor 1 into which is introduced through the pipe 2 a gaseous medium to be processed. The reaction product is supplied through a pipeline 3 to tanks 4 in which the reaction product is subjected to further treatment (washing, drying, purifying or other processes). The product leaving the tank 4 is supplied through the pipeline 5 to a conditioning vessel 6 which it leaves through a line 7, whereupon it is brought in a compressor 8 to a pressure suitable for the further transport. In this facility of the industry involving the conveyance and processing of crude petroleum and natural gas the reactor 1 is encased in a protective shell 9 which provides protection against external climatic influences and airborne objects, prevents unchecked cooling of the reactor surface and captures the product escaping through a leak. This protective shell 9 comprises at its upper end a port leading to the outside.

The monitoring device of this facility comprises a sensor, signal converters associated with the sensors, a processor and memories for comparison values.

The reactor 1 is monitored by an odor sensor 11 and a solid-structure microphone 12. The odor sensor 11 is disposed in or above the port of shell 9. In this location it is capable of detecting most readily the odor of gas, having a specific weight less than air, escaping from the large-area surface of the reactor 1 since the gas tends to flow out through this port into the open air. The solid-structure microphone 12 is capable of detecting the presence of sound sources such as occur at leakage sites through the flow of the medium. Since in a reactor often random noise formation occurs, an identically constructed comparison microphone 13 is disposed in another location of the reactor whose output signals are superimposed in opposite phase onto the output signals of the acoustic sensor 12 in a circuit within a processor 50. This permits largely eliminating interfering noises.

With each sensor 11, 12, 13 is associated a signal converter 21, 22, 23 in which signals processable in processor 50 are generated. With each sensor 11, 12, 13 is further associated a memory 31, 32, 33 for comparison values from measurements shortly after start of operation of the facility and/or from the measurements carried out before the particular measurement such that comparison values necessary for the operation of the processor 50 are available, which characterize the normal status in the particular facility part involved.

The tanks 4 are monitored by odor sensors 14, signal converters 24 associated with them and comparison value memories 34 as well as solid-structure microphones 15 and signal converters 25 associated with them and comparison value memories 35.

The conditioning vessel 6 is monitored by odor sensors 16, signal converters 26 associated with them, and comparison value memories 36 as well as temperature sensors 17, and temperature sensor 17 are connected to signal converter 27 and comparison (value) memories and for the evaluation in the processor 50 comparison value memories are provided.

The compressor 8 is monitored by a solid-structure microphone 18 disposed on the bearing of its rotor, a signal converter 28 associated with it and comparison value memory 38, and a temperature sensor 19 as well as a signal converter 29 associated with it and comparison value memory 39. Against the escape of gases, monitoring by means of the odor sensor 30 is carried out, with which is associated a signal converter 20.

In addition to this monitoring by means of measuring occurring solid-structure sound, odor and temperature changes, a visual remote monitoring also takes place by means of a television camera 40 which is mounted on a carriage 41 and whose signals are supplied to a signal converter 42. At especially critical sites of the facility are provided spray instruments 43 for spraying a liquid which forms a foam in the event of a gas leak, which are activated by signal converters 44 if they are within the field of vision of a camera 40.

The particularity of this monitoring device is the evaluation of the performed measurements in the processor. Here spurious data determined by a measurement are brought into relationship to the results of other measurement whereby it is achieved that erroneous alarms which could be triggered by random events, are avoided, and that the status of the facility is determined objectively without subjective assessments by the inspection personnel.

The monitoring device of FIG. 2 is disposed on a tower 45. It comprises a video camera 46, an infrared camera 47, and a directional microphone 48 which are installed on a pivoting device 49. With it, sequential in time, these sensors are always directed successively onto the same measuring points such that in the processor 50 spurious values can be determined based on comparison values from earlier measurements. With the various facility parts odor sensors 30 are directly associated which are disposed under hoods 56 with which leakage gas can be captured. These odor sensors are connected to the processor 50. The information originating in the odor sensors 30 are here in processor 50 processed with the information from the video camera 46, the infrared camera 47, and the directional microphone 48 to form a facility status report.

The monitoring device of FIG. 3 is disposed on a carriage 51 which travels on tracks 52 along a pipeline 3, 5. It comprises a video camera 46 set up on the carriage 51 as well as a further video camera installed on a support, an infrared camera 47 and a solid-structure microphone 54 borne on a pivot arm of a pivoting device 53 and a temperature sensor 55 also borne on the pivot arm of a pivoting device 53. The information from these sensors and pickups are conducted further to a processor 50 by means of a transmitter. With this device these sensors are continuously directed to different measuring points in time sequence such that in processor 50 spuriousnesses of the facility can be determined on the basis of comparison values from earlier measurements.

The invention thus creates the possibility, by defining problem fields with specification of the location and of the event, of being immediately able to take countermeasures without time loss and, specifically, to prevent access to critical zones and thus to increase the health and safety of inspection personnel and to be able to protect the environment by acting in time.

As discrete elements function sensors and systems for specific observations. The evaluation of these perceptions takes place individually and integrally in relationship to one another. Only in this way is a sound and well-based statement possible and necessary actions can be correspondingly triggered.

In the field of natural gas production, a continuous monitoring of the gas-conducting facility parts takes place for effects, such as external influences through unauthorized persons or natural events, gas leakages, visible through ice formation on facility parts, emissions in the presence of schlieren formation and liquid accumulations as well as a preventive detection of facility failures through the recording and evaluation of thermal conditions.

The acoustic listening instruments, as far as they are oriented toward the airborne sound, are disposed in the facility such that a detection and assessment of the operating and exceptional conditions of the facilities becomes meaningful through sound analysis. These sensors permit the acoustic detection of the presence of unauthorized persons, of gas leaks, of irregular facility conditions such as store damage, pump disturbances, etc. as well as a clear separation between facility and ambient sounds.

Instruments for detecting structure-borne sound, in addition, record irregularities in the operation of machines and the conditions of the facility and transfer them further to the central evaluation system. With the acoustic detection instruments and the succeeding central evaluation unit no individual sound is monitored for exceeding the limit value but rather a total image of the sound field (frequency spectrum) in the facility is recorded and compared with the particular succeeding images. Based on the changes of these noise images with respect to intensity and spectral distribution (also Fourier-transformed) conclusions are drawn of the technical status of the facility. The result comprises differentiating the intended changes from the unintended changes.

With the sensors "smelling" upon the smallest trigger threshold alarm is given and thus counteractions are allowed before the human smell threshold is reached. Consequently already extremely small leakages and emissions can be identified. The fundamental novelty of the process, apart from the sensible sensor technique, resides primarily in the evaluation procedure which detects different odor effects and outputs an alarm only if the medium to be checked of the facility itself is the cause of the alarm activation.

The great reliability of the findings about the condition of the process facility is lastly only reached with the logic linkage of the individual monitoring components. Thus, upon the response of an odor sensor, the camera is moved in the direction of the first responding sensor and, for example, the escape of a medium by locating the event or by measuring partial temperature changes is confirmed and simultaneously a localization is carried out. The maintenance personnel can better prepare for the event. Apart from the escape sounds of a medium, also changes in the process flow or changed noises on machines and valves are recorded with the acoustic transmitters and supplied to an evaluation. Here also, findings are verified and confirmed with the inclusion of the other monitoring variables "Odor" and "Optics".

The data acquisition and processing accepts the measuring results (evaluated or unevaluated) of the individual measurement components in order to generate pre- and/or main alarm, to initiate switching actions and also to make available an operator surface. At the central control site the individual measurement components are subjected to a plausibility check before a display occurs of the attained alarm thresholds, for determining the operating status of the facility and for the provision of measures. The linkage of the local sensors or evaluation units with the higher-level monitoring system takes place over secured teleaction systems.

With this novel technical system the following advantages can be brought about:

the cyclic rotation through the facilities by maintenance personnel is replaced by continuous monitoring "round the clock", Errors are thus recognized as they develop and damage to facilities and emissions is prevented or minimized, Operating personnel is alerted and warned of possible dangers before they enter the facilities, Maintenance personnel can be trained more rapidly since the period of experience is shorter—this yields greater flexibility and improves motivation, In this way a small number of experts can cover and inspect large areas and can provide specific actions, Interferences from the outside (vandalism) can be detected immediately and perpetrators can be identified, After maintenance work and repairs, in addition to the routine checks, a further automatic "check" of the facilities status can be implemented.

What is claimed is:

1. Process for monitoring facilities of the chemical industry, in which by means of acoustic sensors, cameras and electronic odor sensors electronic data are generated and these are supplied to an evaluation device with comparison circuitry, memories for electronically acquired data and display as well as report-generating devices, in which the temporary acquired electronic measurement values are compared with measurement values of an initial measurement and the preceding measurement and, in the event given deviation values are exceeded, a report process is triggered in which the electronic measurement values obtained f rom the acoustic sensors, cameras and electronic odor sensors, before they are supplied to the evaluation station, are corrected with electronic measurement values obtained from acoustic comparison sensors, cameras and electronic odor sensors.

2. Process as claimed in claim 1,
in which the measurement and evaluation is carried out at specific time intervals, and/or
in which the location of the acoustic sensors, cameras and/or electronic odor sensors is changed after each measurement.

3. Process as claimed in claim 1, in which infrared cameras are used as the cameras and in the evaluation facility locations of increased or decreased temperature are identified.

4. Process as claimed in claim 1,
in which cameras and/or video cameras are used inter alia for identifying outside influences, persons, natural events, fluid accumulations and the like.

5. Process as claimed in claim 1,
in which an artificial head equipped with microphones is applied for the identification of the direction of the sound and/or
in which as acoustic sensors solid-structure microphones are used which are disposed on pipes, machines, bearings, pumps, pressure generators and similar facility parts, and/or in which as acoustic sensors directional microphones are used which are directed to specific facility parts or whose effective direction extends next to specific facility parts.

6. Process as claimed in claim 1, in which, upon the report of a spuriousness, the flow of the automatically running measurement process is interrupted and measuring instruments, in particular an infrared and/or video camera, are moved by manual or automatic control to the location which has been reported as suspicious.

7. Monitoring device of facilities of the chemical industry, comprising acoustic sensors, cameras, electronic odor sensors and an evaluation device with comparison circuitry, memories for electronically acquired data and display and/or report-generating devices, wherein the evaluation device comprises comparison circuitry in which the temporary acquired electronic measurement values are compared with measurement values of an initial measurement and the preceding measurement and, in the event given deviation values are exceeded, a report process is triggered with a correction circuit which, on the one hand, is connected to the acoustic sensors, cameras and electronic odor sensors serving for monitoring the facility parts and, on the other hand, to acoustic comparisons sensors, comparison cameras and electronic comparison odor indicators.

8. Device as claimed in claim 7, with a circuit for initiating the measurement processes at different locations of the facility to be monitored at specific time intervals and/or with a circuit for the continuously repeated initiation of the measurement cycle.

9. Device as claimed in claim 7, with movable, displaceable and/or pivotable supports of the microphones, cameras and/or electronic odor indicator and a circuit for changing the measurement locations between each two measurements.

10. Device as claimed in claim 7 with infrared cameras for the identification of sites of increased or reduced temperature in the evaluation facility and/or with solid-structure microphones which are disposed on pipes, machines, bearings, pumps, pressure generators and similar facility parts, and/or with an artificial head equipped with microphones for detecting the direction from which the sound comes, and/or with directional microphones which are directed toward specific facility parts or whose effective direction extends next to specific facility parts.

11. Device as claimed in claim 7, with a circuit in which, upon the report of a spuriousness, the flow of the automatically running measurement process can be interrupted and measuring instruments, in particular an infrared and/or video camera, can be moved by manual control to the site reported as suspicious.

12. Device as claimed in claim 11, with a memory and an application device for a control substance.

13. Device as claimed in claim 7, with tracks for vehicles supporting measurement and observation instruments and/or with movable supports of the measurement recorders of the sensors.

14. Device as claimed in claim 7, in which sensors are disposed in areas endangered by explosions and/or with visual sensors for detecting persons and objects.

* * * * *